United States Patent [19]
Diepers et al.

[11] 3,895,432
[45] July 22, 1975

[54] METHOD OF ELECTRICALLY JOINING TOGETHER TWO BIMETAL TUBULAR SUPERCONDUCTORS

[75] Inventors: Heinrich Diepers, Erlangen-Bruck; Karl-Heinz Jablonski, Ebermann-Stadt; Hans Lamamatsch, Nurnberg, all of Germany

[73] Assignee: Siemens Aktiengesellschaft, Munich, Germany

[22] Filed: June 20, 1974

[21] Appl. No.: 481,260

[30] Foreign Application Priority Data
July 4, 1973 Germany............................ 2334055

[52] U.S. Cl................. 29/599; 29/471.7; 174/94 R; 219/121 EM
[51] Int. Cl.............................................. H01v 11/14
[58] Field of Search .......... 29/599, 471.7, 482, 502; 174/DIG. 6, 94 R; 219/121 EM

[56] References Cited
UNITED STATES PATENTS

| | | |
|---|---|---|
| 3,011,255 | 12/1961 | Washburn et al.................. 29/471.7 |
| 3,184,535 | 5/1965 | Worthington.................. 174/94 R X |
| 3,422,529 | 1/1969 | Nuding .................................. 29/599 |
| 3,449,818 | 6/1969 | Lowe et al....................... 29/599 X |
| 3,453,378 | 7/1969 | McInturff......................... 174/94 R |
| 3,523,358 | 8/1970 | Zimmer et al. ................... 29/599 X |
| 3,523,361 | 8/1970 | Kinter et al............................ 29/599 |
| 3,777,368 | 12/1973 | Pfister et al........................... 29/599 |
| 3,783,503 | 1/1974 | Diepers et al......................... 29/599 |

*Primary Examiner*—Richard J. Herbst
*Assistant Examiner*—D. C. Reiley, III
*Attorney, Agent, or Firm*—Kenyon & Kenyon Reilly Carr & Chapin

[57] ABSTRACT

A method of joining two bimetal tubes at their end faces, the bimetal tubes consisting of a normally conducting metal with a superconducting layer in which the end sections of the bimetal tubes are provided with annular superconducting adapters after which a normally conducting connecting tube is placed in a close fitting manner in the end of the first bimetal tube and then the end of the second bimetal tube arranged around the portion of the connecting tube protruding from the first bimetal tube in a close fitting manner after which the two end faces of the adapters are joined together by welding or the like.

30 Claims, 11 Drawing Figures

METHOD OF ELECTRICALLY JOINING TOGETHER TWO BIMETAL TUBULAR SUPERCONDUCTORS

BACKGROUND OF THE INVENTION

This invention relates to the joining of two bimetal tubes of the type comprising a layer of normal conducting metal with an outer or inner cylindrical surface plated with a layer of superconductive material, in general, and more particularly to an improved method of joining such tubes.

It is well known that niobium is highly suited as a superconducting material for superconducting cables used to transmit large quantities of electrical energy. In particular, its use for superconducting single-and three-phase cables has become recognized. It is particularly useful in this application because it has a very high lower critical magnetic field $H_{c1}$ of about 120,000 A/m and has relatively low a-c losses as long as the critical magnetic field is not exceeded. Niobium can advantageously be used in superconducting cables in the form of a layer applied to a tubular carrier of a metal such as copper, which at a temperature of 4 to 5 K, i.e., the temperature necessary to maintain superconductivity in the niobium, has good electric normal conductivity and a high thermal conductivity. The layer of superconducting niobium can be made relatively thin since below the critical field intensity $H_{c1}$, current flows only in a thin surface layer which is less than 0.1 $\mu$m thick. It has been recognized that for superconducting single- and three-phase cables, it is particularly advantageous to arrange copper tubes covered with a niobium layer on the inside or the outside coaxial to each other. Preferably, the niobium layers on the outside of the inner tube and on the inside of the other tube of the coaxial pair of conductors. The inner tube may be used as the outgoing line and the outer tube as the return conductor which will result in electric and magnetic fields occuring only in the space between the niobium layers with the copper tubes remaining free of fields so that no eddy current losses can occur therein.

In tubular conductors of this nature consisting of a niobium layer and a copper layer, the copper is used for stabilizing the superconductive niobium by taking over, at least partially, the current flowing in the superconducting niobium if the niobium undergoes a transition from the superconducting to the normally conducting state, e.g., in the event of an overload, and removes the heat loss generated in this process or heat losses of the a-c loss type and transfers them to an adjacent coolant.

Such tubular conductors of the highly conductive metal on which a superconducting layer is applied on the inside or on the outside are advantageously manufactured in definite, limited lengths, e.g., about 20 m. As a result, a long superconducting cable must be assembled from a large plurality of such bimetal tubes, with the bimetal tube even joined together directly by welding or the like or between which tubes resilient bellows are arranged for equalizing expansion.

Various problems are encountered in joining bimetal tubes of this nature. The different nature of the two materials used and the need to maintain both a superconducting path and a normally conducting stabilizing path must be met. Thus, it is an object of this invention to provide a simple method for joining such bimetal tubes together.

SUMMARY OF THE INVENTION

The present invention solves this problem for bimetal tubes having an outer superconducting layer by providing the end section of each bimetal tube at its end face with an annular adapter of the superconductive material. Subsequently, there is placed in the end of the first bimetal tube, now provided with an adapter, one half of a connecting tube of normally conducting metal. It is inserted therein with a close fit. The end section of the second bimetal tube also provided with an adapter is then placed around the half of the connecting tube protruding from the first bimetal tube, again with a close fit. The two free end faces of the adapters are then joined together. In cases where the superconducting layer is deposited on the inside of the bimetal tubes, the end section of each of the bimetal tubes is provided at its end face with an annular adapter of superconductive material. The two free end faces of the adapters are then joined together and the two ends of the bimetal tubes provided with the adapters are then enclosed within a common sleeve made of the normally conducting metal. As with the previous embodiment, such enclosure is done with a close fit.

The advantages obtained with the construction of the present invention are in particular a mechanically stable joint of two bimetal tubes and a perfect electrical connection which is made without the need to interrupt the stabilizing properties of the normally conducting metal at the joint.

In a further advantageous embodiment of the invention described herein, a particularly mechanically stable joint between two bimetal tubes having a superconducting outer layer is achieved by providing each adapter and the end section of the bimetal tube connected with it with an internal thread and the connecting tube with a corresponding external thread. The two bimetal tubes are then screwed together with the connecting tube between. In addition to the screw connection, the connecting tube can also be soldered, at least partially to the ends of the two bimetal tubes enclosing it. For this purpose, the outer cylindrical surface of the connecting tube is preferably coated at least partially with solder.

In accordance with a further embodiment of the invention, two bimetal tubes having inner cylindrical surfaces coated with a layer of superconductive material can be joined together by providing the outside surfaces of the adapters which are joined together as described above with a coating of the normally conducting metal and by then soldering them to the sleeve. The sleeve can be soldered to the end sections to advantage. For this purpose, a sleeve having its inner cylindrical surface coated at least partially with solder can be used. The individual parts are then soldered together by heating the sleeve from the outside.

DETAILED DESCRIPTION OF THE PREFERRED EMBODIMENT

Figure 1:
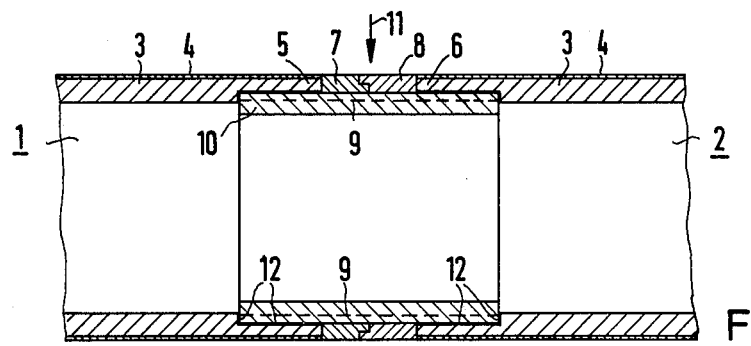
FIG. 1 is a longitudinal cross section through two niobium copper bimetal tubes having niobium layers on the outside joined together in accordance with the method of the present invention.

FIG. 1 illustrates two bimetal tubes, 1 and 2, each comprising a tube 3 of normally-conducting metal such as copper, (aluminum may also be used), clad with a layer 4 of superconducting material such as niobium. Bimetal tubes 1 and 2 each have approximately the same inside and outside diameter. Each is provided at their end sections 5 and 6 respectively, with contacts in the form of adapters 7 and 8 respectively. The adapters 7 and 8 are made of the superconductive material in such a manner that a well-adhering and electrically conducting connection with the normally conducting carrier tube 3 along with the superconducting layer 4 applied to it is produced. The end faces of the adapters 7 and 8 opposing each other are provided with centering steps so that they engage each other with a close fit when the two bimetal tubes 1 and 2 are joined together. Thus, on the figure, the common contact surface of the two adapters 7 and 8 is shown with the step in the radial direction. As can be seen from FIG. 1, the two ends 5 and 6 and adapters 7 and 8 connected to them are machined to a common inside diameter before the two bimetal tubes 1 and 2 are joined together. Preferably, an internal thread is then cut into them from the tube ends. The threads are cut not only in the normally conducting carrier tube 3 but also in the adapters 7 and 8. This means the adapters must be of sufficient thickness to permit such cutting. A corresponding connecting piece 10 made of normally conducting metal with a matching external thread is then constructed. The connecting piece is then screwed approximately halfway into one of the bimetal tubes for example, the bimetal tube 1. The second bimetal tube 2 is then screwed over the protruding half of the connecting tube 10. The two tubes 1 and 2 are screwed together tightly until a close tight fit between the adapters 7 and 8 is obtained. Once the individual parts are screwed together in this manner, the contact surfaces of the two adapters 7 and 8 are then welded together, preferably by an electron beam. In particular, an electron beam emanating from a cathode ring may be used. Welding may be done with a beam selector aperature traveling around the outer contact edge of the two end faces approximately concentrically. In welding it is essential to check whether the normally conducting metal can lead to trouble in the welded seam underneath the weld. If such is the case, it is advantageous not to weld all the way through.

Electron beam welding is performed from the outside with a radially guided electron beam indicated on the figure by the arrow 11. This generally leads to a slight shrinkage of the material in the direction of the axis of the bimetal tubes. This shrinkage which in some cases has a detrimental effect in the case of the present invention is advantageous since the shrinkage clamps the carrier tubes 3 more firmly onto the connecting tube 10. This produces a good thermal and electrical contact between the superconductive material of adapter 7 and 8 and the normally conducting metal of the connecting tube 10 as well as between the normally conducting metal of the connecting tube 10 and the carrier tubes 3. In addition, a solder joint can be made in the region of the copper to copper contact of the connecting tube 10 with the carrier tubes 3 by saturating the threaded parts with solder prior to assembly and using the heat conducted off through the normally conducting metal during electron beam welding for soldering. The areas saturated with solder are indicated in the figure by somewhat thicker lines designated 12. When using soldering, it may in some cases be possible to eliminate the use of threads. In such a case, the connecting tube must then be surrounded by the two end sections 5 and 6 including the adapters 7 and 8 with a tight fit.

Figures 2, 3:
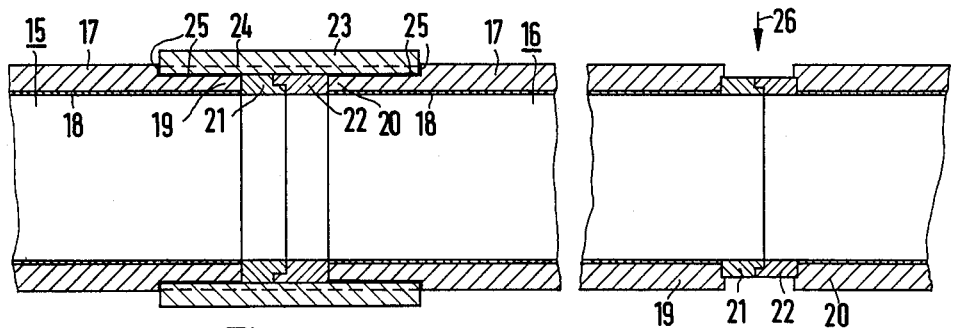
FIG. 2 is a corresponding joint for niobium-copper bimetal tubes having the niobium layer on the inside.
FIGS. 3 to 5 illustrate in similar views, a further embodiment of the invention for joining two niobium-copper bimetal tubes, each having a niobium layer on the inside.

FIG. 2 illustrates the junction of two bimetal tubes 15 and 16 each consisting of a normally conducting carrier tube 17 such as copper and provided at their end faces with adapters 21 and 22 of a superconductive material such as niobium. These bimetal tubes, however, have their superconducting layer 18, which may be a layer of a metal such as niobium, on the inside of the tubes 15 and 16. The joining of bimetal tubes 15 and 16 with the superconducting layer 18 on the inside cannot be accomplished by the exact same technique as that disclosed in connection with FIG. 1, i.e., by means of an outer sleeve of normally conducting metal, since electron beam welding of the adapters 21 and 22 attached as contacts at the ends 19 and 20 can be performed only before a sleeve is put in place. Thus, the bridging of the adapters 21 and 22 by means of a sleeve 23 of normally conducting material such as copper can take place only after the electron beam welding of the adapters 21 and 22.

Thus, in accordance with the present invention, when joining tubes of the type shown in FIG. 2, the copper end sections 19 and 20 and the niobium adapters 21 and 22 located between them are first machined down somewhat from the outside for example, in a lathe operation. This is done after the niobium adapters 21 and 22 are welded together using electron beam welding. This is illustrated on FIG. 2 by the dashed line 24 which shows the level of the material before machining. After machining, an external thread is cut into the machined down surfaces, the thread being cut both into the niobium adapters 21 and 22 and into the copper end sections 19 and 20. Subsequently a copper sleeve 23 which may comprise, for example, two half cylinders and which has a corresponding internal thread is soldered on. The soldering takes place only between the copper ends 19 and 20 and the cooper sleeve 23. The soldered surfaces are indicated on the figure by the thicker lines 25. Intimate contact between the niobium adapters 21 and 22 and the copper sleeve 23 is achieved, however, if the bimetal tubes 15 and 16 are used in superconducting cables, through the cooling to the temperature of helium, the cooling medium. This results directly from the fact that the thermal expansion coefficient of copper is about twice that of niobium.

In some cases, it may be possible to dispense with good thermal and electrical contact between the two niobium adapters 21 and 22 which, as described above, is generally accomplished through electron-beam welding. This is evident from the following calculation example. In such a case it is sufficient to push the copper sleeve 23 over the contact of the two niobium adapters 21 and 22 and to also solder it on both sides to the niobium adapters. A similar joining technique can be applied to the bimetal tube described above in connection with FIG. 1. In the following calculation estimate, it is thus assumed that there is no direct connection between the end faces of the niobium adapters 21 and 22 but an indirect connection through the copper sleeve 23.

For the worst case, a power loss of $10 \times 10^{-6}$ W/cm$^2$ at 50 Hz and a field of 100 mT can be considered. These values are assumed to be the upper limits. As an example of an embodiment, the following dimensions of bimetal tubes according to FIG. 1 or FIG. 2 are selected: Bimetal tube outside diameter 60 mm; bimetal tube inside diameter 58 mm; width of the niobium tube consisting of the two niobium adapters about 6 mm; and width of the two end sections including the niobium tube about 30 mm. With these niobium tube dimensions, the total loss referred to the outer cylinder surface of the tube is about $113 \times 10^{-6}$ W. Assuming a steady-state heat flux, the source of the heat residing in the contact area of the two niobium adapters and an energy outflow to the copper of the end sections of the tubes on both sides, from this data a temperature rise of the contact area of $3.7 \times 10^{-4}$ K is calculated. A heat conduction coefficient of 50 mV/cm. K at 4 K was used for niobium. For a widening of the niobium adapters which might be necessary for technical reasons connected with the welding to, say, 20 mm, a temperature rise of $1.2 \times 10^{-3}$ K is obtained for otherwise equal conditions.

A very good joint between the niobium adapters 21 and 22 and the copper sleeve 23 surrounding them can be made by a diffusion bond between the niobium and copper, for example, by a method of copper vapor pre-deposition. This joining technique is illustrated on FIGS. 3 to 6. As shown on FIG. 3, the adapters 21 and 22 attach to the ends 19 and 20 of the bimetal tubes are joined together with a tight fit and are welded together using an electron beam directed radially from the outside onto the contact surface of the two adapters 21 and 22 at the end face as is indicated on the figure by arrow 26.

Figure 4:
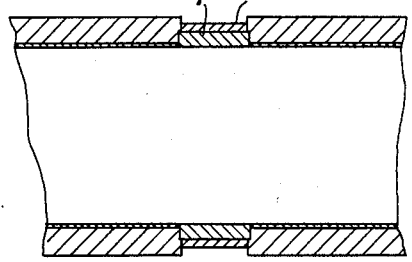

The next step of the process is illustrated by FIG. 4. The outside surface of the two adapters 21 and 22 is provided with a copper layer 27. The niobium is preheated to about 200°C in a high vacuum and a copper layer 27 about 1 μm thick is vapor-deposited at this temperature. Through this process, a solderable copper-niobium bond is obtained. It is also possible to melt the copper on. For applying the copper sleeve 23 as illustrated on FIG. 5, in principle the steps described above in connection with FIG. 2 can be carried out. That is, a threaded or straight connection may be used and the two halves of the copper sleeve 23 soldered to the copper tube ends and now also to the copper layer over the niobium.

Figures 5, 6:
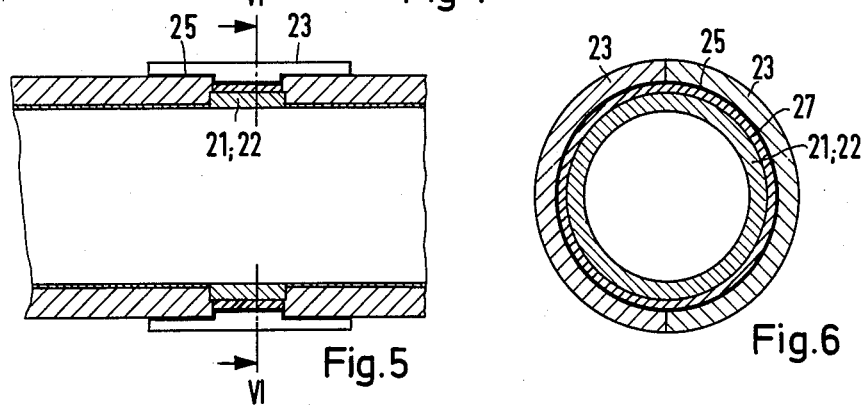
FIG. 6 is a cross section through a joint of two bimetal tubes made by the method illustrated on FIGS. 3 to 5.

The common soldered area is again designated as 25 in FIG. 5. The inside surface of the common niobium adapters 7 and 8 according to FIG. 1 can, of course, be treated and soldered similarly. In that case, copper vapor pre-deposition must be carried out at the two tube ends before electron-beam welding. The subsequent electron-beam welding of the niobium adapters need not influence the niobium-copper diffusion layer to any great extent since the welded seam does not need to be brought all the way through.

A cross section of the joint of FIG. 5 is illustrated on FIG. 6. The adapters 21 or 22 are shown clad by a narrow copper layer 27, the thickness of which is exaggerated in the figure. The two halves of the sleeve 23 are soldered around the copper cladding with a tight fit at the common contact surface 25.

FIGS. 7 through 10 show the steps which may be used in joining niobium adapters 7 and 8 and the niobium-clad niobium-copper tube of the end sections 5 and 6 such as that of FIG. 1. The same joining technique can also be applied to bimetal tubes with the superconducting layer on the inside such as those shown on FIG. 2. The problem presented in making such a joint is that it is on one hand very difficult to weld a thin niobium skin approximately 50 μm thick to a niobium ring about 1 mm thick, as is required, for example, for superconducting cables. This results from the great difference in heat conduction of the materials having different cross sections.

In addition, the proximity of the copper aggravates the situation, since copper has a melting point of only 1083°C as compared to a melting point of about 2468°C for niobium. This leads to further distortion of the desired symmetrical heat conduction relative to the two sides of the welded seam.

By using the method illustrated by FIGS. 7 to 10, these difficulties are largely avoided. The bimetal tubes shown in these figures may have, for example, the dimensions given in the calculation example above.

Figure 7:
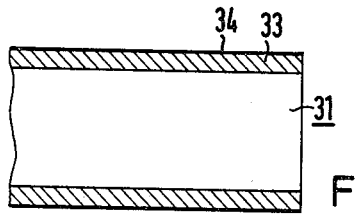
FIGS. 7 to 10 are longitudinal cross sectional views illustrating the individual process steps for welding niobium adapters to bimetal tubes with a thin outer niobium layer.
Figure 8:
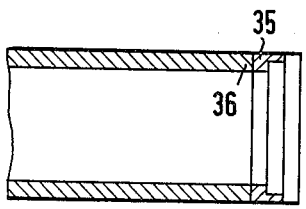
Figure 9:
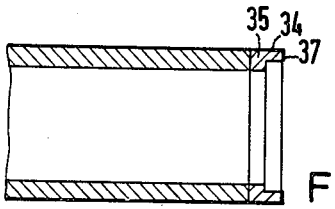
Figure 10:
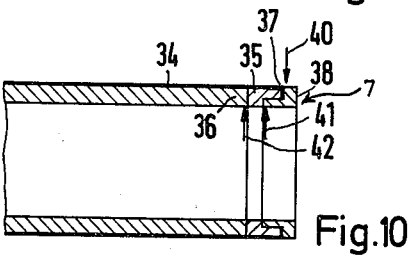

Starting with the tube such as that shown on FIG. 7 the copper 33 is first removed at the end of a niobium-copper bimetal tube 31 for a distance of, for example, 6 to 10 mm wide, using chemical etching or some other conventional technique. In order to obtain an edge as sharp as possible and to seal off the interior of the tube, a rubber stopper may be inserted to an appropriate depth. After the copper is etched away, the thin-walled niobium layer 34, about 50 to 100 μm thick, is exposed. A profiled niobium ring 35 with the appropriate dimensions is then inserted as illustrated by FIG. 8. It is pushed in down to the new copper end face of the end section 36. The profiled niobium ring will preferably have on its inside a step profile. The overhanging end 37 of the thin niobium layer is then bent over the end face edge of the profiled niobium ring 35 as shown on FIG. 9 so that at least part of the end face of the niobium ring 35 is covered by the overhanging end 37. Subsequently, a second parallel ring 38 with a corresponding external profile on its end face is pushed onto the profiled ring 35 as shown on FIG. 10 so that the thin niobium skin of the end 37 is clamped between the two profiled niobium rings 35 and 38. Thereby the symmetrical heat conduction desired for the welding is approximately achieved at both sides of the welded seam and the difficulty of welding a thick wall to a thin wall part is largely avoided. Subsequently, the individual parts are welded together using electron beams, the electron beams being indicated by arrows 40, 41 and 42. The electron beam 40 is not directed directly onto the clamping point of the end of the niobium layer 37, since this would cause the thin niobium layer at the clamping point to burn through locally. Instead, the electron beam indicated by arrow 40 is directed somewhat to the side of the clamping point onto the profiled niobium ring 38 so that the profiled ring 38 is actually melted onto the end 37 of the niobium layer 34. In the step immediately following, the two profiled niobium rings 38 and 35 are welded together on the inside to form an adapter, for example, the adapter 7 of FIG. 1, in order to increase mechanical stability. This is shown by the arrow 14. Finally, the copper of the end section 36 is joined to the niobium adapter 7 by melting the copper in the immediate vicinity of the niobium adapter. In this process, a diffusion bond between the copper of the end section 36 and the niobium of the adapter 7 is advantageously produced.

In addition to the method illustrated on FIGS. 7 to 10 for applying contacts to the end sections of bimetal tubes with niobium adapters, several possibilities for attaching niobium adapters during the manufacture of bimetal tubes are possible.

Figure 11:
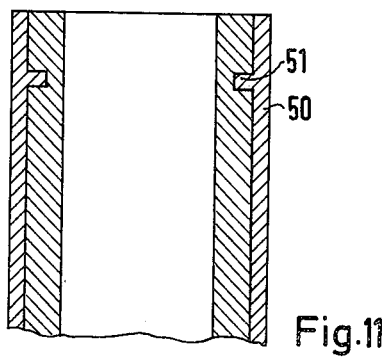
FIG. 11 is a longitudinal cross sectional view of a bimetal tube with an adapter during one phase of its manufacture.

As indicated schematically on FIG. 11, a thick-walled outer niobium tube 50 is machined out in such a manner that near the end of the tube, a ring shaped shoulder 51 is left standing. Its dimensions are chosen so that after the bimetal tube is drawn out for thinning, the shoulder 51 will have the thickness required for the niobium adapter. After the drawing operation, the end of the tube is then turned down to the shoulder 51 which may then be turned down further to obtain the step form of the adapter. In addition, an initially pure copper tube can have placed at its ends, niobium adapters and the niobium layer then applied by means of fusion electrolyisis or the like. Such a method may be used where a good bond must be achieved with the copper as well as with the niobium adapter.

In accordance with a further method, bimetal ribbons are first fabricated in lengths greater than the required tube lengths. Appropriate manufacturing methods for such fabrication are disclosed for example, in German Offenlegungsschriften Pat. Nos. 2,141,636 and 2,141,621. Niobium cross pieces are then welded to the niobium foils at spacings of the tube length. The niobium frame so created is then filled with copper. The strip obtained in this manner is then bent to form a tube and is seam-welded lengthwise. The niobium cross pieces formed into adapters are then cut through at the center to make individual bimetal tubes and are finished in the required form of the adapters. In a similar manner, the niobium cross pieces can also be joined first to a copper ribbon. After this, the thin niobium layer can be applied and the bimetal strip subsequently bent to form a tube and then welded.

Thus, improved methods for joining bimetal tubes comprising a carrier metal and a superconducting layer have been disclosed. Although a number of specific examples of the methods have been given, it will be recognized by those skilled in the art that various modifications may be made without departing from the spirit of the invention which is intended to be limited solely by the appended claims.

What is claimed is:

1. A method for joining the end faces of two bimetal tubes made of a normally conducting metal plated with a layer of superconductive material on one of its inside and outside comprising the steps of:
   a. securely attaching to each tube in a tight fitting manner an annular adapter made of the superconductive material;
   b. metallurgically bonding together the adapters and the superconductive layers on each of said tubes; and
   c. joining together the normally conducting metal portions of said tubes using a cylindrical connecting member of a normally conducting material;
   d. wherein when said superconducting layer of material is on the outside, said normally conducting metal portions of the said tubes are joined by a cylindrical connecting member on the inside of said tubes after which said metallurgically bonding step is carried out, and when said superconductive layer of material is on the inside, said adapters are first metallurgically bonded together after which said cylindrical connecting member is joined to the outside of said tubes.

2. The method according to claim 1 wherein said layer of superconductive material is on the outside and wherein said cylindrical connecting member is first inserted inside one of said bimetal tubes in a tight fitting manner, after which the other of said bimetal tubes is placed over the protruding end of said connecting member in a tight fitting manner with the adapters on the ends of said bimetal tubes abutting, and said adapters are then metallurgically bonded together.

3. The method according to claim 1 wherein the inside diameter of the adapters on said bimetal tubes is approximately equal to the inside diameter of the end sections of said tubes.

4. The method according to claim 3 wherein the inside diameters of the adapters and of the end sections connected with them are made equal.

5. The method according to claim 4 wherein the adapters and connected end sections of said bimetal tubes are provided with internal threads and wherein said connecting member contains a matching external thread whereby said two bimetal tubes may be screwed together through said connecting members.

6. The method according to claim 5 wherein said connecting member is at least partially soldered to the end sections of said bimetal tubes surrounding it.

7. The method according to claim 1 wherein said connecting member is at least partially soldered to the end sections of said bimetal tubes surrounding it.

8. The method according to claim 6 wherein the outside of said connecting member is at least partially coated with solder before its assembly with said bimetal tubes.

9. The method according to claim 1 wherein said layer of superconductive material is on the inside.

10. The method according to claim 9 wherein each end section of said bimetal tubes is provided with an adapter having an outside diameter at least approximately the same as the outside diameter of the end section.

11. The method according to claim 10 wherein the outside diameters of said adapters and of said end sections connected thereto are made equal to each other.

12. The method according to claim 11 wherein said outside diameters are made equal by turning them down.

13. The method according to claim 12 wherein said cylindrical connecting member is a cylindrical sleeve comprising at least two individual pieces subdivided lengthwise.

14. The method according to claim 13 wherein the outside surfaces of said adapters after being metallurgically bonded together are coated with a normal conducting metal and are then soldered to said sleeve.

15. The method according to claim 14 wherein said coating and normally conducting metal is applied by means of vapor depositing and melting on.

16. The method according to claim 15 wherein said sleeve is soldered to the end sections of said bimetal tubes.

17. The method according to claim 16 wherein the inside surface of said sleeve is coated at least partially with solder prior to placing it around said bimetal tubes.

18. The method according to claim 17 wherein soldering is carried out by heating said sleeve.

19. The method according to claim 1 wherein the end faces of the adapters are provided with a profile designed to center the two bimetal tubes when they are metallurgically bonded together.

20. The method according to claim 1 wherein the end faces of said adapters are metallurgically bonded together by at least partial welding using an electron beam.

21. The method according to claim 20 wherein an electron beam is directed radially from the outside toward the contact area of the two adapters.

22. The method according to claim 21 wherein the adapters are welded together using an electron beam emanating from a ring cathode.

23. The method according to claim 22 wherein the electron beam welds the adapters together at their common contact surface by means of a beam selector aperature traveling around the outer contact ends of the two end faces approximately concentric.

24. The method according to claim 1 wherein copper is the normally conducting metal of the bimetal tubes.

25. The method according to claim 1 wherein aluminium is the normally conducting metal of the bimetal tubes.

26. The method according to claim 1 wherein niobium is the superconductive material used in said superconductive layer and said adapters.

27. The method according to claim 1 wherein an adapter is applied to the end section of a tube by steps comprising:
  a. removing the normally conducting metal of the end section for predetermined distance from the end to form a counter bore;
  b. fitting to the counter bore end face a first profiled ring of the superconductive material having a surface facing away from the superconducting layer which is provided with at least one step having a width smaller than the region of the removed normally conducting metal at the end section;
  c. bending the overhanging end of the superconducting layer over the end of said first profiled ring;
  d. inserting a second profiled ring of approximately the same width and having opposing steps formed therein, said ring being of the same superconductive material into said first ring;
  e. welding said two profiled rings to the end of said superconducting layer and to the normally conducting metal of the end section using electron beam welding.

28. The method according to claim 27 where the normally conducting metal of the end section is removed by etching.

29. The method according to claim 27 wherein said normally conducting metal is removed by lathe turning.

30. The method according to claim 27 wherein electron beam is directed onto one of the profiled rings to the side of the bent over end of the superconducting layer clamped therebetween to such an extent that it does not strike the superconductive material of said bent over end.

* * * * *

UNITED STATES PATENT AND TRADEMARK OFFICE
CERTIFICATE OF CORRECTION

PATENT NO. : 3,895,432
DATED : July 22, 1975
INVENTOR(S) : HEINRICH DIEPERS ET AL It is certified that error appears in the above-identified patent and that said Letters Patent are hereby corrected as shown below:

In column 6, line 53, change "a second parallel ring 38" to --a second profiled ring 38--

In column 7, line 8, change "arrow 14" to --arrow 41--

In column 8, line 9, (Claim 1), delete "said" after --portions of the--

Signed and Sealed this twenty-fifth Day of November 1975

[SEAL]

Attest:

RUTH C. MASON
Attesting Officer

C. MARSHALL DANN
Commissioner of Patents and Trademarks